United States Patent
Li et al.

(10) Patent No.: US 12,100,425 B2
(45) Date of Patent: Sep. 24, 2024

(54) MACHINE LEARNED VIDEO TEMPLATE USAGE

(71) Applicant: Loop Now Technologies, Inc., San Mateo, CA (US)

(72) Inventors: Wu-Hsi Li, Somerville, MA (US); Edwin Chiu, Cupertino, CA (US); Jerry Ting Kwan Luk, Menlo Park, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 78 days.

(21) Appl. No.: 17/489,843

(22) Filed: Sep. 30, 2021

(65) Prior Publication Data

US 2022/0108726 A1    Apr. 7, 2022

Related U.S. Application Data

(60) Provisional application No. 63/226,081, filed on Jul. 27, 2021, provisional application No. 63/196,252, filed on Jun. 3, 2021, provisional application No. 63/169,973, filed on Apr. 2, 2021, provisional application No. 63/086,077, filed on Oct. 1, 2020.

(51) Int. Cl.
*G11B 27/031* (2006.01)
*G06V 20/40* (2022.01)

(52) U.S. Cl.
CPC ............ *G11B 27/031* (2013.01); *G06V 20/41* (2022.01)

(58) Field of Classification Search
None
See application file for complete search history.

(56) References Cited

U.S. PATENT DOCUMENTS

| | | | |
|---|---|---|---|
| 8,069,414 B2 | 11/2011 | Hartwig et al. | |
| 8,244,707 B2 | 8/2012 | Lin et al. | |
| 8,572,490 B2 | 10/2013 | Hartwig et al. | |
| 9,118,712 B2 | 8/2015 | McCoy et al. | |
| 9,532,116 B2 | 12/2016 | Terpe | |
| 9,619,123 B1 * | 4/2017 | Hughes | H04N 21/4394 |
| 9,824,372 B1 | 11/2017 | Seth et al. | |
| 10,089,402 B1 | 10/2018 | Winkler et al. | |
| 10,455,297 B1 * | 10/2019 | Mahyar | H04N 21/4532 |

(Continued)

FOREIGN PATENT DOCUMENTS

KR      101606860 B1      3/2016

*Primary Examiner* — Gelek W Topgyal
(74) *Attorney, Agent, or Firm* — Adams Intellex, PLC

(57) ABSTRACT

Techniques for video generation based on machine learned video template usage are disclosed. A plurality of videos is obtained, and video scene analysis on each video is performed. Video cuts for each video are detected, and objects within each video are identified. The identifying includes detecting a person, face, building, or vehicle. Metadata is categorized for each of the videos based on the scene analysis, the video cuts, and the objects within the videos. Template information is stored, including the categorized metadata, on each of the videos. Each video is stored as a template video along with the template information. The template information on a subset of videos is ranked. A basis video is selected based on the template information. A further video is generated based on the basis video. The further video is stored as a further template video along with the template videos.

24 Claims, 9 Drawing Sheets

(56) References Cited

U.S. PATENT DOCUMENTS

| | | | |
|---|---|---|---|
| 11,158,344 B1* | 10/2021 | Townsend | H04N 9/79 |
| 2010/0149359 A1 | 6/2010 | Taoka | |
| 2013/0021373 A1 | 1/2013 | Vaught et al. | |
| 2013/0145267 A1 | 6/2013 | Ramachandran | |
| 2013/0246141 A1 | 9/2013 | Liberty | |
| 2013/0276021 A1 | 10/2013 | Cho | |
| 2014/0229331 A1 | 8/2014 | McIntosh et al. | |
| 2014/0376876 A1 | 12/2014 | Bentley et al. | |
| 2015/0195175 A1 | 7/2015 | Kariman | |
| 2015/0213516 A1 | 7/2015 | Jeremias | |
| 2015/0278348 A1 | 10/2015 | Paruchuri et al. | |
| 2016/0021333 A1* | 1/2016 | Lim | H04N 5/91 386/248 |
| 2016/0065929 A1 | 3/2016 | Barcons-Palau et al. | |
| 2016/0088369 A1 | 3/2016 | Terpe | |
| 2016/0093105 A1 | 3/2016 | Rimon et al. | |
| 2017/0024614 A1* | 1/2017 | Sanil | G06F 16/70 |
| 2017/0092324 A1* | 3/2017 | Leonard | G11B 27/34 |
| 2017/0092331 A1* | 3/2017 | Eppolito | H04N 21/47205 |
| 2017/0109584 A1 | 4/2017 | Yao et al. | |
| 2017/0111688 A1* | 4/2017 | Hundemer | G08B 5/36 |
| 2017/0339093 A1 | 11/2017 | Pesavento et al. | |
| 2018/0005665 A1* | 1/2018 | Knutt | H04N 5/91 |
| 2018/0039406 A1 | 2/2018 | Kong et al. | |
| 2018/0068019 A1* | 3/2018 | Novikoff | G06F 16/739 |
| 2018/0089322 A1 | 3/2018 | DeLuca | |
| 2018/0132011 A1 | 5/2018 | Shichman et al. | |
| 2018/0253765 A1 | 9/2018 | Avedissian et al. | |
| 2018/0288396 A1 | 10/2018 | Bouazizi et al. | |
| 2019/0286676 A1 | 9/2019 | Fatzinger | |
| 2021/0014559 A1 | 1/2021 | Thapaliya | |

* cited by examiner

MACHINE LEARNED VIDEO TEMPLATE USAGE

RELATED APPLICATIONS

This application claims the benefit of U.S. provisional patent applications "Machine Learned Video Template Usage" Ser. No. 63/086,077, filed Oct. 1, 2020, "Inline Frame Based Video Rendering Within Browser" Ser. No. 63/169,973, filed Apr. 2, 2021, "Frame And Child Frame For Video And Webpage Rendering" Ser. No. 63/196,252, filed Jun. 3, 2021, and "Video Stream Interface Based On Third-Party Webpage Information" Ser. No. 63/226,081, filed Jul. 27, 2021.

Each of the foregoing applications is hereby incorporated by reference in its entirety.

FIELD OF ART

This application relates generally to video generation and more particularly to machine learned video template usage.

BACKGROUND

Personal electronic devices provide access to a seemingly endless supply of information. One of the most popular uses of these devices is web surfing. While web surfing can be the basis for meaningful and productive activities such as research, education, or work, more often than not, the web surfing is undertaken for shopping, entertainment, and gaming, among similar activities. The information found by web surfing can inform, educate, entertain, amuse, and enrage, among many other reactions. When not web surfing for productive purposes, people love to watch, experience, and interact with video content such as games, television programs, movies, cat and puppy videos, and other video content. Although audio-only presentations can be informative and entertaining, many people prefer the more engaging and immersive experience that results when the presentations include both video and audio. The videos can be short, long, useful, silly, educational, etc. As with web surfing, time spent viewing videos can be productive or not. Many video viewing activities can provide meaningful experiences. More often, however, the videos are viewed for diversion. For some viewers, video viewing can be competitive or even addictive, such as competing to determine how many cat videos one can watch in a single sitting, or endlessly binge-watching all eight seasons of a popular fantasy drama. Access to some of the online video services is free, while access to other online video content requires a one-time payment, a purchase, or a subscription.

Video content can be found at numerous websites, streamed from online subscription services, or purchased for electronic download. Access is accomplished by starting a web browser and navigating to the website. The website homepage provides access to a wide variety of videos. A user can click on a video related to a topic of interest. From a user perspective, finding interesting videos often begins with navigating to a familiar website. Another approach includes a general web search or a topic search using a search engine. The manner in which the user composes their search has a profound impact on the success or failure of their search. A poorly composed search can generate an inordinate volume of "potential" results or hits. A searcher wants to find the desired videos easily and immediately. A provider wants their available videos to be quickly matched to the customer's query. In fact, the provider's business can succeed or fail based on the timely presentation of the desired results to the customer. The results can also include close matches and recommended other videos that might be of interest to the customer. The search needs to present relevant results to the potential customer quickly and concisely. If not, the customer will go elsewhere or will simply give up the search due to loss of interest or patience, or lack of time.

SUMMARY

People use a wide variety of electronic devices to view and interact with media content. Commonly used electronic devices include those which are widely available such as desktop computers, laptop computers, tablets, smartphones, and PDAs. The media content with which the people interact can include news, sports, political media, educational media, streaming media, and so on. Perhaps the most popular media includes social media, where individuals, celebrities, influencers, tastemakers, and others present their media wares to inform, influence, persuade, or even misguide their followers. The social media content can be easily accessed using social media apps, web browsers, etc., which are available for all of the most popular electronic devices. The social media content frequently includes video content, where the video content can include videos, video clips, short-form videos, graphic interchange format files (GIFs), animations, mashups, etc. This latter content can further include audio and text which are used to enhance the video viewing experience. The enhanced viewing experience makes the viewing more entertaining, informative, educational, meaningful, motivational, and the like. An individual viewing the social media content may wish to respond by commenting on or reacting to the content, or they may be motivated to respond by producing and posting their own social media content. Their own content can start with a basis video which can be enhanced, edited, altered, or otherwise adapted to the thoughts, beliefs, feelings, etc., of the individual. The content generated by the individual can then be added to the previous body of content for storage, access, and use as a basis video for further generated videos.

Video generation is based on machine learned template usage. The template can be used for selecting a basis video and for generating a further video derived from the basis video. A computer-implemented method for video generation is disclosed comprising: obtaining a plurality of videos wherein video scene analysis is performed on each of the plurality of videos; detecting video cuts for each of the plurality of videos; identifying objects within each of the plurality of videos; categorizing metadata for each of the plurality of videos based on the scene analysis, the video cuts, and the objects within the plurality of videos; storing template information, including the metadata which was categorized, on each of the plurality of videos; selecting a basis video from the plurality of videos based on the template information; and generating a further video based on the basis video. Each video of the plurality of videos can be stored as a template video along with the template information. One of the template videos can be selected and used as the basis video. The generated further video can be stored as a further template video along with the original template videos. As for the obtained videos, the further template video can include further template video information on scene analysis, video cuts, and objects within the further video. Selecting a video template can be based on the template information that was ranked. Further, the basis video can be selected from the plurality of video templates that were recommended. The selecting the basis video can be accomplished via automatically curating a subset of the plurality of videos. The curating can comprise picking, by a neural network, the subset of the plurality of videos.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
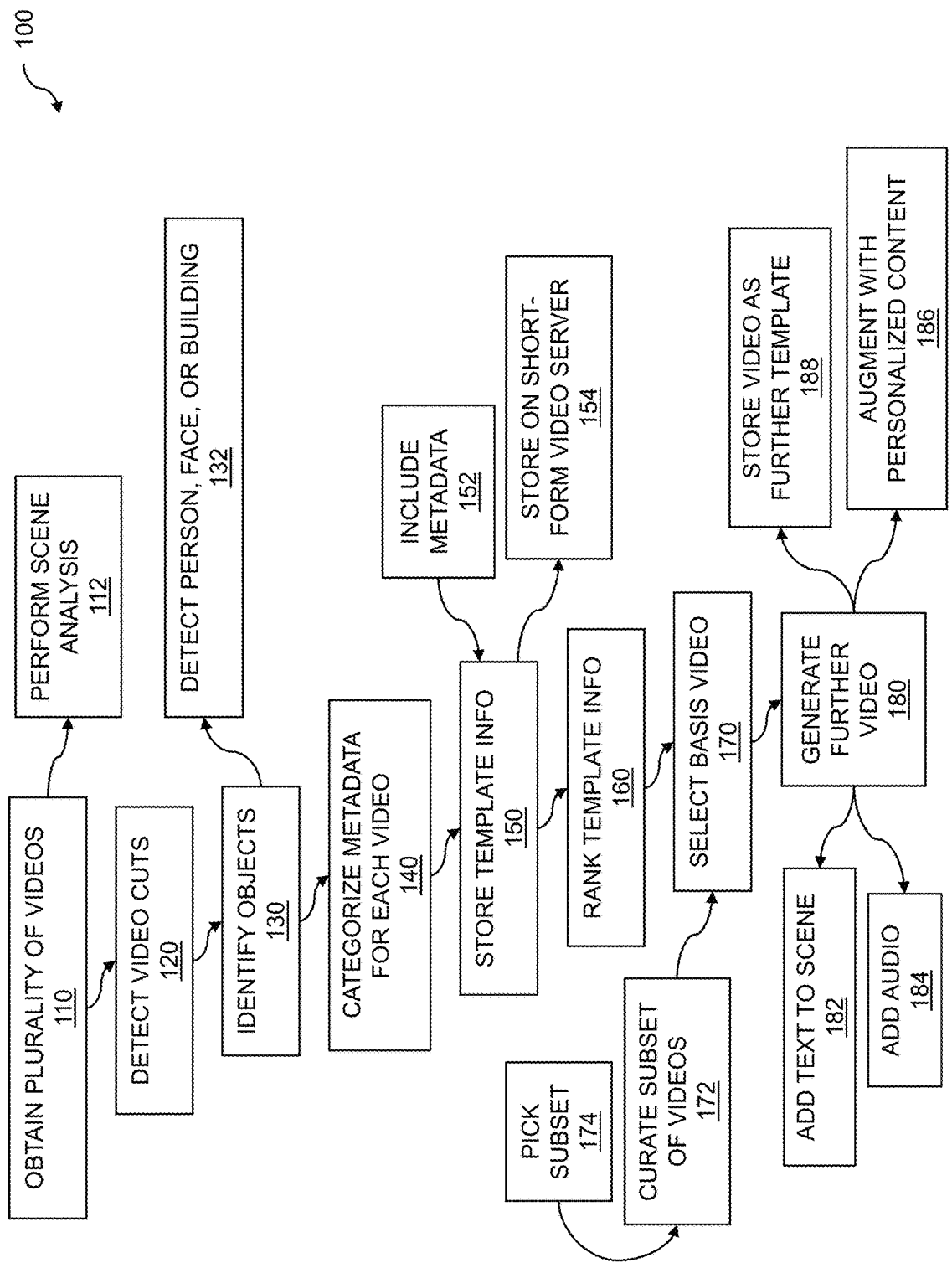
FIG. 1 is a flow diagram for machine learned video template usage.

Techniques for video generation based on machine learned video template usage are disclosed. Individuals such as users, consumers, influencers, tastemakers, politicians, and others can enhance their likes, shares, comments, and statements through rich, often eye-catching, multimedia "presentations" on social and other media. These presentations, which can include mashups or productions of video clips, short-form videos, still images, audio, and text, are used to promote the individual's opinions, preferences, statements, creativity, etc., in engaging and often entertaining ways. The videos can be generated for personal use or amusement, for social sharing, for education or training, for making political statements, and so on. Locating videos from which an individual can generate their own video can be daunting because the number of available videos easily runs to the billions. Further, digital rights management (DRM), licensing, and other agreements can prevent access, while expensive and specialized hardware and software can be required for the video generation. The generated videos can include types of videos such as travel videos, cooking videos, home improvement videos, makeup videos, or animal videos. The generated videos can originate from one or more basis videos. The basis videos can be updated, edited, augmented, etc. Audio such as a soundtrack, and text such as meme text, "editorial comments", humorous or ironic statements, and the like can also be added to the generated videos to produce a fuller and richer experience for individuals who view the generated videos. The generated videos can be viewed by one or more individuals using electronic devices such as desktop computers, laptop computers, tablets, smartphones, personal digital assistants (PDAs), and so on.

Machine learned video template usage enables video generation. A plurality of videos is obtained. The videos can include long-form videos, short-form videos, video clips, and so on. Video scene analysis is performed on each of the plurality of videos. The video scene analysis can identify a subject for the video. Video cuts are detected for each of the plurality of videos. The video cuts can include or define transitions or boundaries between scenes or segments within the video. Objects are detected within each of the plurality of videos. The detecting objects can further include identifying objects, where the identifying the objects includes detecting a person, a face, a building, or a vehicle. Metadata is categorized for each of the plurality of videos based on the scene analysis, the video cuts, and the objects within the plurality of videos. The metadata can include subjects, titles, ownership, production data, tags, etc. Template information, including the metadata which was categorized, is stored on each of the plurality of videos. A basis video is selected from the plurality of videos based on the template information. The basis video can be used as a starting point from which an individual can generate their further video. A further video is generated based on the basis video. The generated further video can be stored, shared on social or other media, and the like.

FIG. 1 is a flow diagram for machine learned video template usage. One or more basis videos can be selected based on template information. The basis videos can be used to generate a further video. Videos, which can include short-form videos, long-form videos, video clips, GIFs, animation, etc., can include various media types such as news videos, entertainment videos, political message videos, cooking videos, animal videos, and so on. A short-form video can include a video with a duration of a few seconds, a minute, etc. The videos can be shared, where the sharing can include online sharing through social media and other media. The generated videos can be viewed using an app such as a social media app or a web browser which is accessed on an electronic device used by an individual. The short-form videos, video clips, etc., can be stored on a video server, where the video server can include a local server, a remote server, a cloud-based server, and so on. The video server can include a decentralized server. Templates that are based on categorizing metadata associated with the videos are stored for use in selecting basis videos. The selected basis videos are used to generate a further generated video.

The flow 100 includes obtaining a plurality of videos 110. The videos can be obtained by accessing a local, remote, cloud-based, or distributed repository or library for videos. The videos can include long-form videos with a duration of ten minutes or longer, short-form videos with a duration of ten minutes or fewer, video clips, graphics interchange format (GIF) files, animations, and the like. In the flow 100, video scene analysis is performed 112 on each of the plurality of videos. The video scene analysis can be used to determine the subject of the video, the contents of the video, actions or activities that are taking place within the video, etc. The flow 100 includes detecting video cuts 120 for each of the plurality of videos. A video cut can include an abrupt change between scenes or segments within a video. A video cut can include a transition between video segments. Video cuts can include a match cut, an L-cut, cutting in action, a jump cut, a cross cut, and so on. The detecting video cuts can be used to identify a beginning and an end of a video segment, a scene, a clip, a sequence of frames, etc.

The flow 100 includes identifying objects 130 within each of the plurality of videos. The objects can include animate objects, inanimate objects, natural objects, human-made objects, and so on. The identifying objects can be used for classifying or categorizing the videos, for usage of the videos, and the like. In the flow 100, the identifying the objects includes detecting 132 a person, a face, a building, or a vehicle. Other objects can also be identified. The other objects can include natural objects such as plants, trees, mountains, plains, bodies of water, rivers and streams, etc. The identifying a person can include facial identification of the person, demographics associated with the person, etc. The identifying can include identifying a particular building, a make or model of a vehicle, and the like. The flow 100 can include categorizing metadata 140 for each of the plurality of videos based on the scene analysis, the video cuts, and the objects within the plurality of videos. The video metadata, or "data about data", can include further information about the videos, where the further information can be used for categorizing the videos. The metadata can include a file name, video format or dimensions, creation and publication dates, revision dates and history, etc.

The flow 100 includes storing template information 150 for each of the plurality of videos. The template information can include portions of the videos. The template information can include introductions to the videos, credits, effects, filters, and so on. In embodiments, each video of the plurality of videos can be stored as a template video along with the template information. Video templates can be used for generating further videos. In addition to the template information associated with each of the plurality of videos, video templates can be obtained from other sources. In embodiments, the template videos can be obtained through crowdsourcing. A video, whether obtained, crowdsourced, etc., can be partitioned into video portions. In embodiments, a portion of each video of the plurality of videos can be stored as a template video along with the template information. The portions of each video can be used individually, in part, or in whole. In embodiments the portion comprises a template video module. In the flow 100, the storing template information includes the metadata 152 which was categorized. The storing the metadata can assist with storing, retrieving, matching, etc., a video template with similar video templates. The flow 100 includes storing template information on a short-form video server 154. The short-form video server can include a local server, a remote server, a distributed server, a cloud-based server, and the like.

The flow 100 includes ranking the template information 160 on a subset of videos from the plurality of videos. The ranking of the template information can be based on a variety of factors, criteria, parameters, and so on. In embodiments, the ranking is based on a view count for each video from the subset of videos. The view count can include how many times the video was selected, downloaded, watched, etc. In other embodiments, the ranking can be based on an engagement score for each video from the subset of videos. An engagement score can include an amount of time or a percentage of how much of a video was viewed. In further embodiments, the ranking is based on a segment duration for each video from the subset of videos. A segment duration can include an amount of time, a count of video frames, etc. In embodiments, the ranking can be based on comparison of template information with user text input. A user can add text to a video, where the text can include meme text, a humorous retort, a clarifying comment, and the like. In other embodiments, the ranking can be based on analysis of user provided video for video content, and metadata associated with the user provided video. A user can provide a video that can be analyzed and stored, used as a basis video for a generated further video, and so on. The ranking can be used to rank the user provided video among further videos with similar subjects, themes, included objects, etc. In embodiments, the ranking can be based on a subject for the further video. Videos that include subjects similar to, related to, or associated with the subject for the further video can be ranked based on views, relevance, appropriateness, etc. In further embodiments, the ranking can be based on a classification of the subset of videos. A classification of a video can include a subject, topic, genre, etc. that can describe the video. In embodiments, the video classification can include travel videos, cooking videos, home improvement videos, makeup videos, or animal videos.

The ranking the template information 160 can be accomplished through machine learning. A neural network or equivalent artificial intelligence (AI) can be employed to provide the various ranking bases described above. Alternatively, the ranking can be accomplished through one or more human recommendations. The machine recommendations and the human recommendations can be combined, alternated, or randomly chosen. In embodiments, the ranking is provided in a non-deterministic manner. The non-deterministic manner can ensure that a user proceeding down a certain selection path receives a different set of rankings on a subsequent usage as compared to an initial usage.

The flow 100 includes selecting a basis video 170 from the plurality of videos based on the template information. A generated further video, discussed below, can be generated from the basis video. The basis video can be added to, edited, altered, combined with further basis videos, and so on. The selecting can include selecting a video template. Embodiments include selecting a video template based on the template information that was ranked. The selecting can be based on popularity, recommendations, social media trends, memes, and so on. In other embodiments, the basis video can be selected from the plurality of video templates that were recommended. In the flow 100, the selecting the basis video is accomplished via automatically curating a subset of the plurality of videos 172. The automatic curating can be accomplished using an algorithm, a routine, a procedure, and so on. In the flow 100, the curating comprises picking 174, by a neural network, the subset of the plurality of videos. The neural network can include a neural network for machine learning, deep learning, and so on. The neural network can be trained to curate the picking of the subset of videos by applying a training dataset that includes videos and expected results associated with each of the videos within the training dataset. The curating a subset of videos 172 can be accomplished using a human recommendation in combination with the machine learning recommendation.

The flow 100 includes generating a further video 180 based on the basis video. The generating the further video can include adding to, removing from, editing, altering, adjusting, adapting, etc., the basis video. More than one basis video can be used for generating the further video. Other information, in addition to the video information associated with the basis video, can be included while generating the further video. In the flow 100, the generating the further video can include adding text 182 to one or more scenes from the basis video. The text can include text entered by a user, where the text can include meme text, humorous text, clarifying text, angry text, and so on. In embodiments, the text can be added in fillable text boxes on one or more scenes of a subset of the plurality of videos. The flow 100 further includes adding audio 184 to one or more scenes from the basis video. The audio can include speech; human generated sounds such as laughing, crying, or screaming; music; music samples; and so on. The flow 100 includes augmenting 186 the basis video with personalized video content. The augmenting can include uploading a video, GIF, or animation; uploading still images; uploading audio files; and the like. The flow 100 includes storing the further video 188 as a further template video along with the template videos. The further video can be stored as a whole, as video segments or scenes, and so on. In embodiments, the further template video includes further template video information on scene analysis, video cuts, and objects within the further video. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
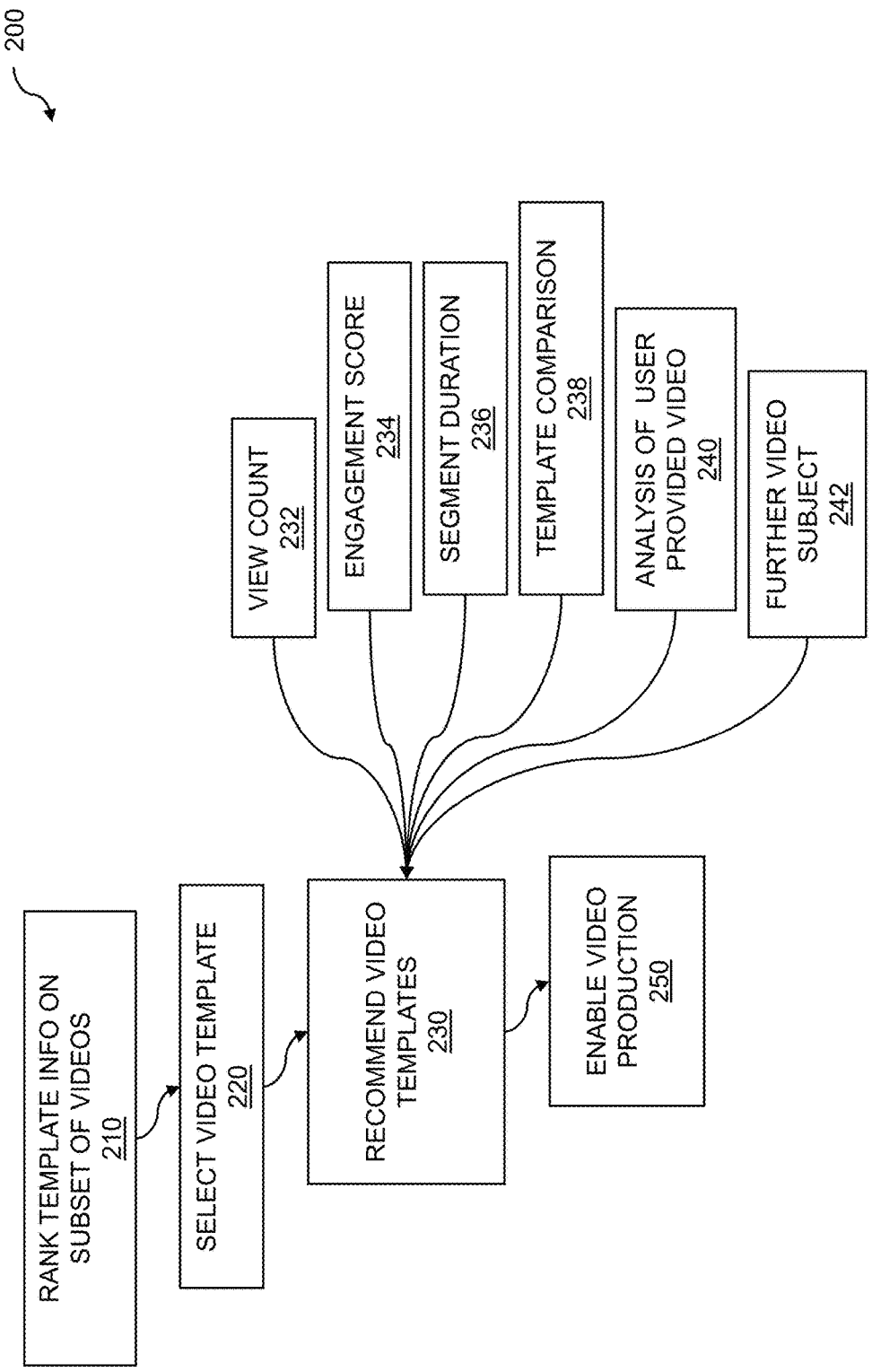
FIG. 2 is flow diagram for video template recommending.

FIG. 2 is flow diagram for video template recommending. One or more video templates can be recommended to an individual who wished to generate a video. The recommending can be based on one or more criteria such as preferences of an individual, popular trends or memes, curated videos, and so on. Template recommending for video generation is based on machine learned video template usage. A plurality of videos is obtained, wherein video scene analysis is performed on each of the plurality of videos. Video cuts are detected for each of the plurality of videos. Objects are identified within each of the plurality of videos. Metadata is categorized for each of the plurality of videos based on the scene analysis, the video cuts, and the objects within the plurality of videos. Template information, including the metadata which was categorized, is stored on each of the plurality of videos. A basis video is selected from the plurality of videos based on the template information. A further video is generated based on the basis video.

The flow 200 includes ranking the template information 210 on a subset of videos from the plurality of videos. The ranking can be based on a threshold, a value, a range of values, a qualification, preferences of an individual, crowdsourcing, popularity, recommendation by an influencer, and the like. The ranking can be based on a view count, an engagement score, analysis of the video, etc. The flow 200 includes selecting a video template 220 based on the template information that was ranked. The selecting a video template can include selecting a video template from a plurality of stored video templates, where the stored videos have been ranked. The selecting can be based on previous selections or preferences indicated by an individual, similarities or themes common to popular videos, subject recommendations, etc. In embodiments, the selecting the basis video can be accomplished via automatically curating a subset of the plurality of videos. The curating can be based on individual preferences, crowdsourcing, social media influencers, etc. In embodiments, the curating can include picking, by a neural network, the subset of the plurality of videos.

The flow 200 includes recommending a plurality of video templates 230 based on the ranking of the template information. Discussed throughout, the recommending also can be based on individual preferences, popularity, and so on. In the flow 200, the recommending can be based on a view count 232 for each video from the subset of videos. The view count can give an indication of the popularity of a particular video. The view count can be high for a variety of reasons including the video being popular, timely, disturbing, cringeworthy, cute, and so on. In the flow 200, the recommending can be based on an engagement score 234 for each video from the subset of videos. The engagement score can be based on an amount of time that individuals were watching or were engaged with a video. The higher the engagement score, the more time spent watching the video. In the flow 200, the recommending can be based on a segment duration 236 for each video from the subset of videos. The segment duration can be based on an amount of time, a frame count, etc. The segment duration can be matched to scene within a video. In the flow 200, the recommending can be based on comparison of template information 238 with user text input. Recall that a user can add text such as meme text, a comment, a witty retort, etc., to a video. By analyzing the text for content, further videos, video segments, etc., can be recommended to the individual. In a usage example, an individual adds text such as, "Cutest puppy ever!" to a puppy video. The recommending could include recommending further puppy videos for inclusion in a further generated video.

In the flow 200, the recommending can be based on analysis of user provided video 240 for video content and metadata associated with the user provided video. The analysis can include classification of the user provided video, where the classification can include a type of video such as a travel video, cooking video, home improvement video, makeup video, animal video, or the like. In the flow 200, the recommending can be based on a subject 242 for the further video. The subject for the further video can include a comical or humorous video, a political video, an educational video, a public service announcement video, a call to action video, etc. The flow 200 includes enabling video production 250. Video production can typically include pre-production, production, and postproduction of the video. Pre-production can include obtaining videos such as short-form videos, basis videos, video templates, metadata, and so on. Production can include selecting one or more basis videos to generate a new or further video. In embodiments, the video production can include video capture and video editing. Post-production can include adding introductory material, providing cuts or transitions between scenes within the further video, adding audio information to the video and the like.

Figure 3:
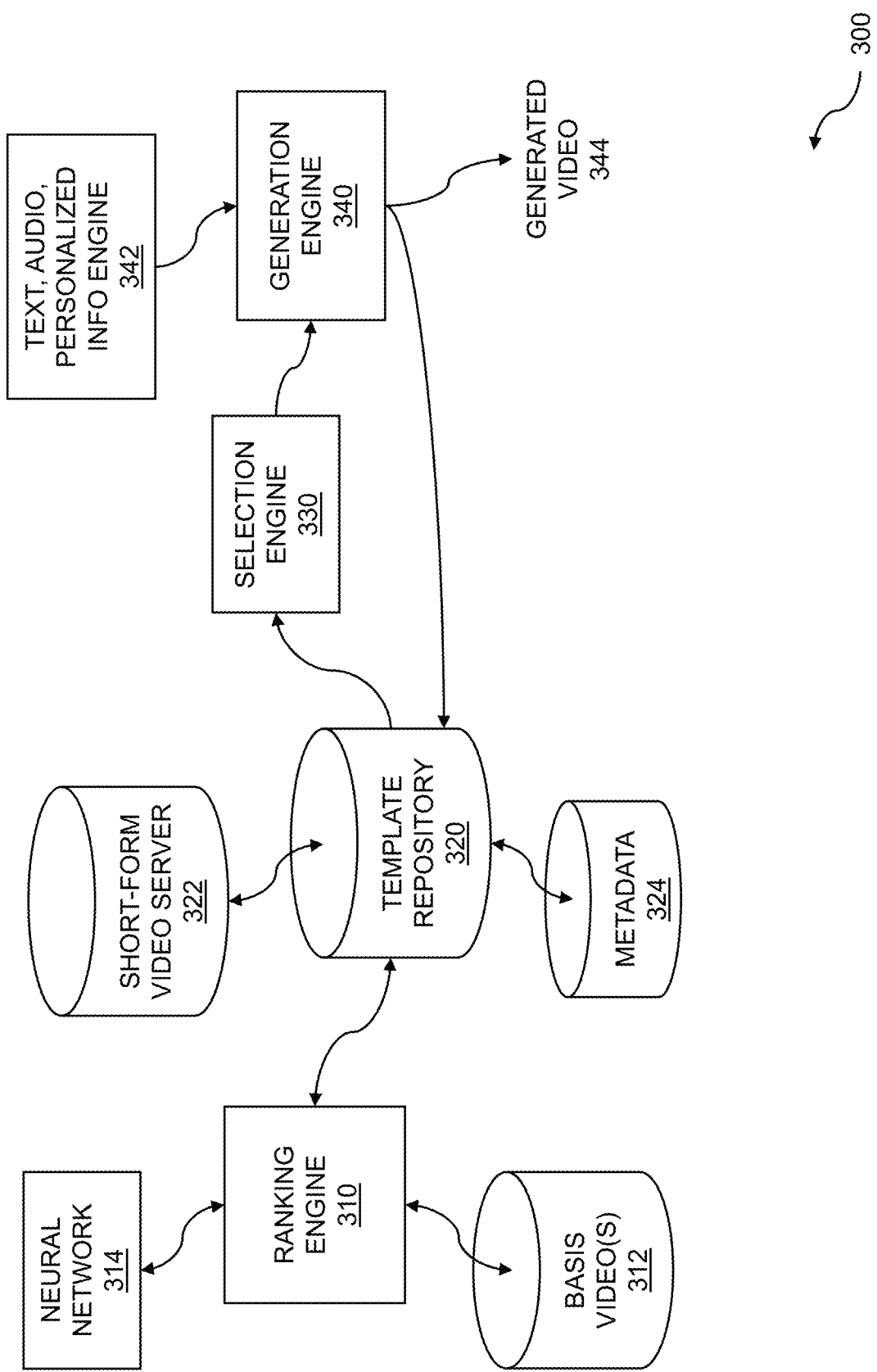
FIG. 3 is a block diagram for template usage.

FIG. 3 is a block diagram for template usage. Template information associated with a plurality of videos can be stored along with metadata associated with the plurality of videos. The template information can include portions of a video that can be edited, augmented, manipulated, and so on. The metadata can be based on scene analysis of the videos. The video templates can be used to generate a further video. The generated further video is generated based on machine learned video template usage. A plurality of videos is obtained, wherein video scene analysis is performed on each of the plurality of videos. Video cuts are detected for each of the plurality of videos. Objects are identified within each of the plurality of videos. Metadata is categorized for each of the plurality of videos based on the scene analysis, the video cuts, and the objects within the plurality of videos. Template information, including the metadata which was categorized, is stored on each of the plurality of videos. A basis video is selected from the plurality of videos based on the template information. A further video is generated based on the basis video.

The block diagram 300 can include a ranking engine 310. The ranking engine can be used to rank videos, video clips, short-form videos, and so on. The ranking of videos can be based on a value, a range of values, a threshold, etc. The ranking can be based on crowdsourced rankings, where the crowdsourced rankings can include videos that are most accessed or most popular, receive the most "likes", and so on. The rankings can be based on recommendations of influencers, tastemakers, trendsetters, Internet personalities, and the like. The ranking engine can be used to rank videos such as basis videos 312. The basis videos can include a plurality of videos, where the videos can be stored in one or more libraries, provided by crowdsourcing, provided by an individual, etc. The basis videos can be used as "starting points" or templates for generating further videos. A neural network 314 can be used by the ranking engine to rank videos. The neural network can include a neural network for machine learning, for deep learning, and so on. The neural network can be trained (i.e., can learn) to assist the ranking engine by ranking videos based on the training. The training can include applying a training dataset to the neural network, where the training dataset includes videos and known results of inferences associated with the videos.

The block diagram can include a template repository 320. A template can be generated for each video. The template can be used to generate a new or further video from a basis video. A template can include an introduction, opening scenes, effects, overlays, filters, etc., for a video. The template can further include information such as locations or scenes within the video into which other videos, still images, text, audio, etc., can be inserted. In embodiments, each video of the plurality of videos can be stored as a template video along with the template information. The template video and the template information can be generated from videos such as short-form videos. Further embodiments can include storing the template information on a short-form video server. The short-form videos can be accessed from the short-form video server 322. The short-form video server can include a local server, a cloud-based server, a distributed server, etc. The short-form videos can include videos with durations ranging from a few seconds to a number of minutes such as ten minutes. The templates within the template repository can be associated with metadata 324. The metadata, or "data about data", can be associated with each basis video, each short-form video, etc. The metadata associated with each video can include a title, description, publication data, editing history, tags, categories, digital rights management (DRM) information, usage information, etc.

The block diagram can include a selection engine 330. The selection engine can select one or more videos. The videos can include basis videos from which a further video can be generated. The video can include one or more short-form videos. Further embodiments can include selecting a video template based on the template information that was ranked. In addition to selecting videos, basis videos, short-form videos, and so on, a plurality of video templates can be recommended based on the ranking of the template information. The recommending can be based on previous selections made by an individual (e.g., usage history), on similar or related videos, on popular videos, etc. In embodiments, the basis video can be selected from the plurality of video templates that were recommended. The selecting can be based on other criteria, rankings, sortings, and so on. In embodiments, the selecting the basis video is accomplished via automatically curating a subset of the plurality of videos. Discussed above, the automatic curation can be accomplished using a neural network such as a machine learning or deep learning neural network.

The block diagram 300 can include a generation engine 340. The generation engine can be used for generating a further video based on the basis video. The further video can also be based on videos provided by an individual, crowd-sourced videos, curated videos, and so on. Further information can be included in the generated further video. Recall that the basis video can include template information, metadata, and so on, associated with the basis video. The block diagram can include a text, audio, and personalized information engine 342. The text, audio, and personalized information can be added in the template. In embodiments, the generating the further video can include adding text to one or more scenes from the basis video. The text can include text associated with a meme, a social media post from an individual, etc. In other embodiments, the generating the further video can include adding audio to one or more scenes from the basis video. The audio can include audio data generated by the individual such as laughing, talking, singing, humorous sounds, etc. The audio can include a soundtrack, where the soundtrack can include songs from a music library within which digital rights to using the songs has been granted. In further embodiments, the generating can augment the basis video with personalized video content. The personalized video content can include still images, drawings, GIFs, animations, or other personalized content that can be obtained by or provided by the individual. The generated further video 344 can be stored. Further embodiments include storing the further video as a further template video along with the original template videos. The storing the further template video can include storing in the template repository 320. In embodiments, the further template video can include further template video information on scene analysis, video cuts, and objects within the further video. By storing the further template video, the further template video can be used by the individual for generating additional videos; can be used by other individuals; and so on.

Figure 4A:
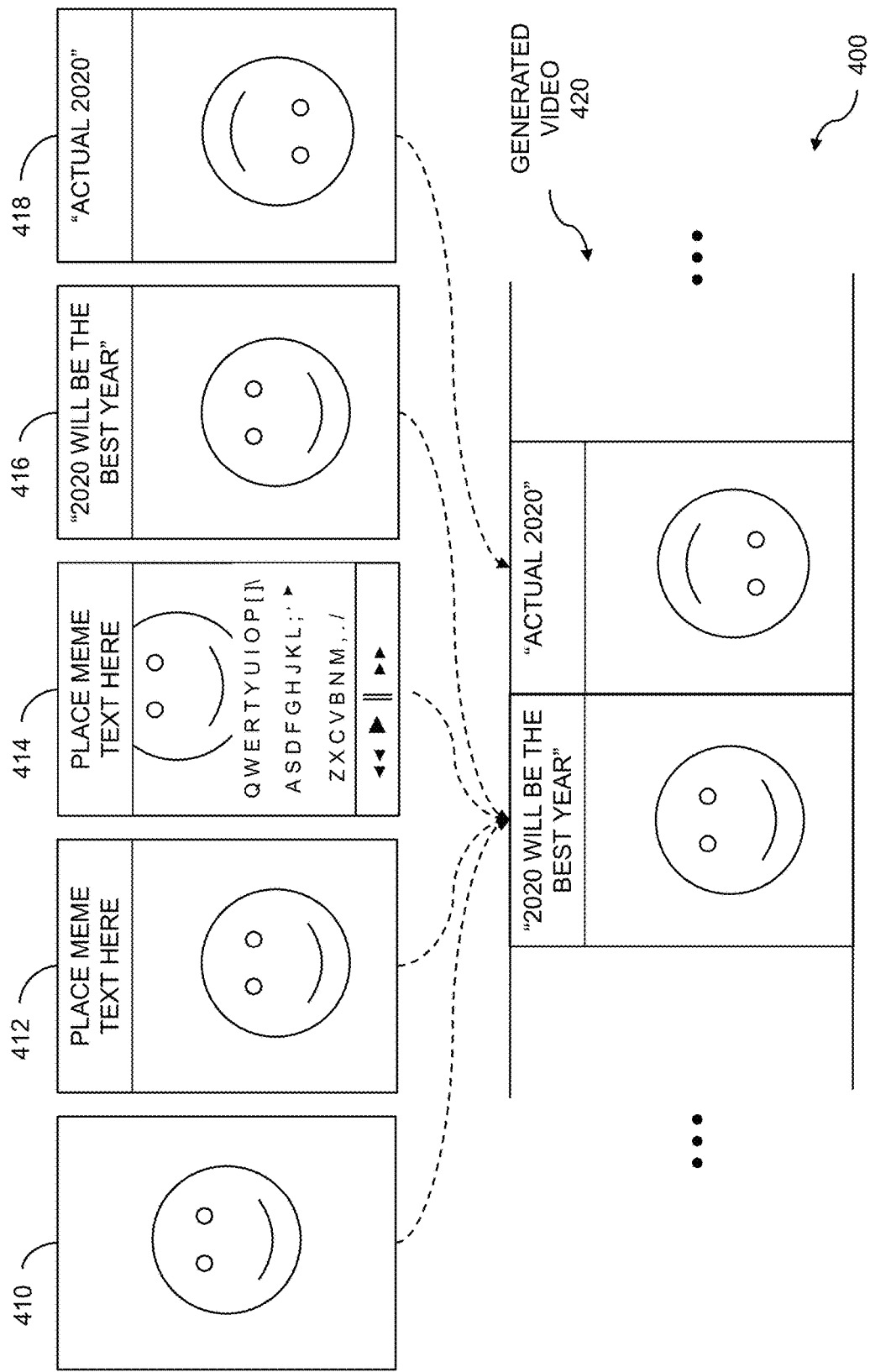
FIG. 4A illustrates a generated video with text.

FIG. 4A illustrates a generated video with text. Video generation techniques can be used by an individual and others to generate a video with text. The text, which can be superimposed on, embedded within, etc., the video, can enable the individual to add information to the video. The information can enhance a story, tell a joke, share or contribute to a popular meme, and so on. Generated video with text is enabled using machine learned video template usage. A plurality of videos is obtained, wherein video scene analysis is performed on each of the plurality of videos. Video cuts are detected for each of the plurality of videos. Objects are identified within each of the plurality of videos. Metadata is categorized for each of the plurality of videos based on the scene analysis, the video cuts, and the objects within the plurality of videos. Template information, including the metadata which was categorized, is stored on each of the plurality of videos. A basis video is selected from the plurality of videos based on the template information. A further video is generated based on the basis video.

A generated video with text is shown 400. The generated video such as a further video can be generated from videos, video segments, etc., that can be recommended to an individual, selected by the individual, and so on. The videos can include videos available in a library of videos, crowdsourced videos, videos uploaded by the individual, videos downloaded from a library, and so on. The videos can include one or more basis videos, where the basis videos can be selected based on template information. In embodiments, the selecting the basis video can be accomplished via automatically curating a subset of the plurality of videos. The curating can be accomplished by crowdsourcing, by an influencer or editor, and so on. The curating can be accomplished using computational techniques for selecting. Selecting the basis video can be accomplished via automatically curating a subset of the plurality of videos. In embodiments, the curating can include picking, by a neural network, the subset of the plurality of videos. Text can be added to selected video or videos. In embodiments, the generating the further video can include adding text to one or more scenes from the basis video. The text can include a message; a statement; an advertisement; a witty, ironic, or sarcastic comment; and the like. The text can include static text, flashing text, rotating text, etc. In other embodiments, the individual can add a soundtrack to their generated video. In embodiments, the generating the further video can include adding audio to one or more scenes from the basis video. The audio can include a voice, licensed music, audio clips, etc.

A basis video 410 can include a video clip in which the individual is shown. The basis video could also include video selected by the individual, where the basis video could contain one or more other persons. The basis video could include a graphic interchange format (GIF), an animation, etc. The individual can be presented with a window or other field superimposed on the video inviting the individual to add text 412 to their selected video. The window or field can include appropriate text instructions such as, "Place your meme text here" or the like. The window or field can be selectable by touching a portion of the screen, performing a mouse click, etc. Selecting the window or field can bring up a keyboard on a smart or handheld device or can enable keyboard input on a computer for text entry 414. The individual can tap or type their desired text 416. The individual can select further basis videos for inclusion in their generated video 418. The further basis videos can include selected or curated videos, videos uploaded by the individual, crowdsourced videos, and so on. The further video can be generated 420 based on the one or more basis videos, text added by the individual, recommended or curated videos, and so on. The further generated video can be stored as a further template video along with the original template videos. The further template video can be selected as a basis video for additional generated videos. In embodiments, the further template video can include further template video information on scene analysis, video cuts, and objects within the further video.

Figure 4B:
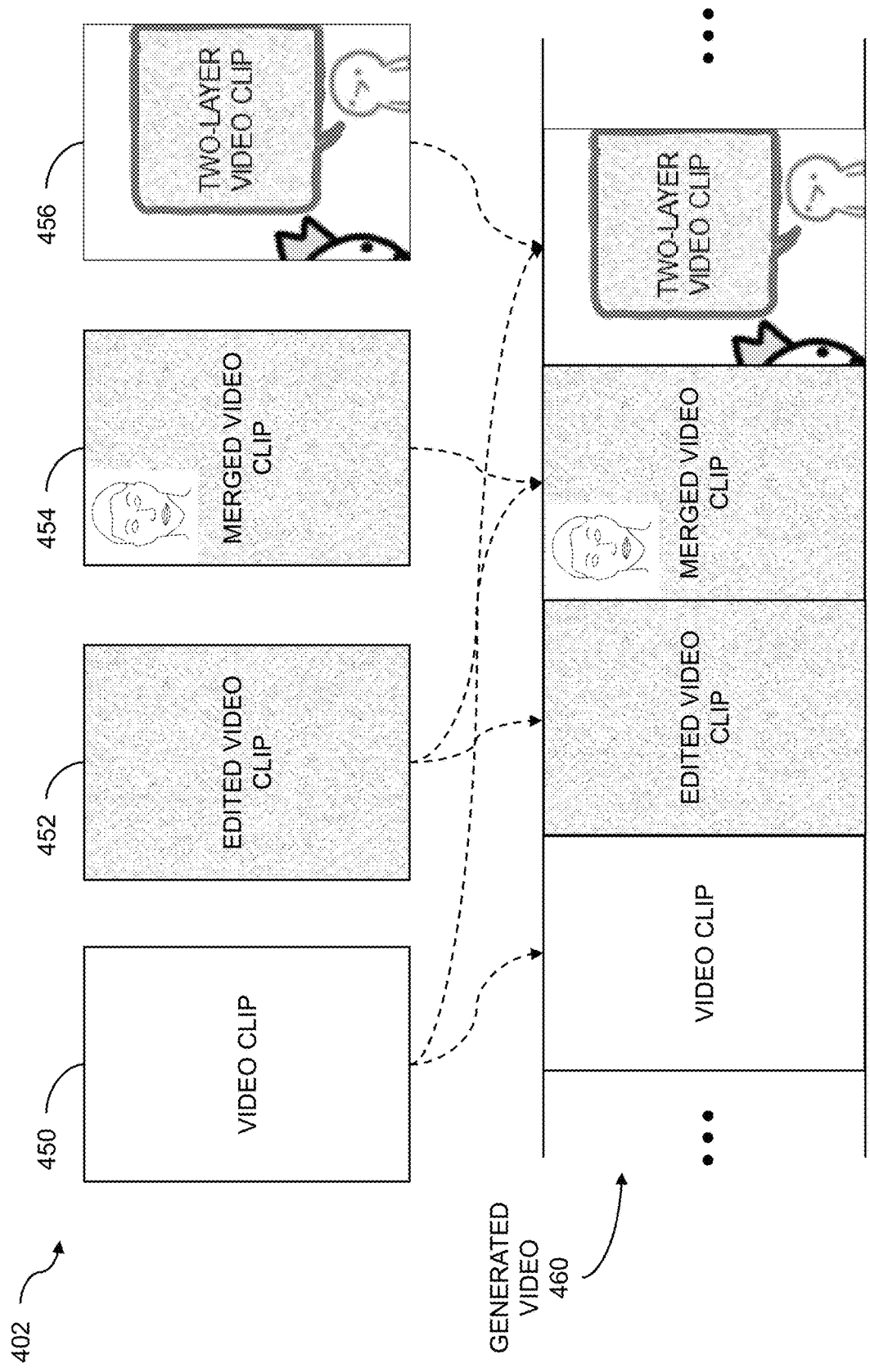
FIG. 4B illustrates a video augmented with personalized data.

FIG. 4B illustrates a video augmented with personalized data. Discussed throughout, videos can be generated based on one or more basis videos, where a basis video can be selected from the plurality of videos that were obtained. The selecting of basis videos is based on the template information and the metadata, where the metadata is based on the categorizing of the videos. The basis video can be augmented with personalized video data, where the personalized video data can be recommended to an individual, provided by an individual, and so on. Augmenting the basis video with personalized data such as personalized video content enables machine learned video template usage.

Described throughout, a further video can be generated from a basis video. A user can augment the basis video with personalized data. A series of video clips 402 are shown that can be used to augment the basis video. An individual can capture a video clip such as video clip 450. The video clip can include, for example, the individual dancing, juggling, performing a task such as undertaking a step in a recipe or a home improvement task, and the like. The individual can edit, alter, enhance, etc. their video clip 452. The editing can include, for example, adding a textured background. Other editing can include cropping, adjusting lighting, using video filters, etc. The individual can merge or superimpose their video clip 454, edited video clip, etc., with an additional video or video clip. The additional video or video clip can include, for example, an inset picture of the individual. Other additional video or video clips can include a basis video, a video uploaded by the individual, a crowdsourced video, etc. In embodiments, a portion of the basis video and a portion of the second basis video or the video of the individual are each used as portions of the further video. The further video can include a plurality of layers 456. In additional embodiments, the portion of the basis video and the portion of the second basis video can include a two-layer template video. The individual can merge or superimpose their video clip, edited video clip, etc. onto one or more further videos or video clips, which could include, for example, a cartoon outline or a meme. The two-layer template video can include an additional video or video clip, a basis video, artwork created by the individual, crowdsourced artwork, a trending meme, etc. The videos augmented by personalized data can result in a generated further video 460. The generated further video can be generated based on detected video cuts, video transitions, and so on. The resulting generated further video with augmented personalized data can tell a story. The story can be directed and produced by the individual. The story can be published on a website, on social media, in a group sharing application, and so on.

Figure 5A:
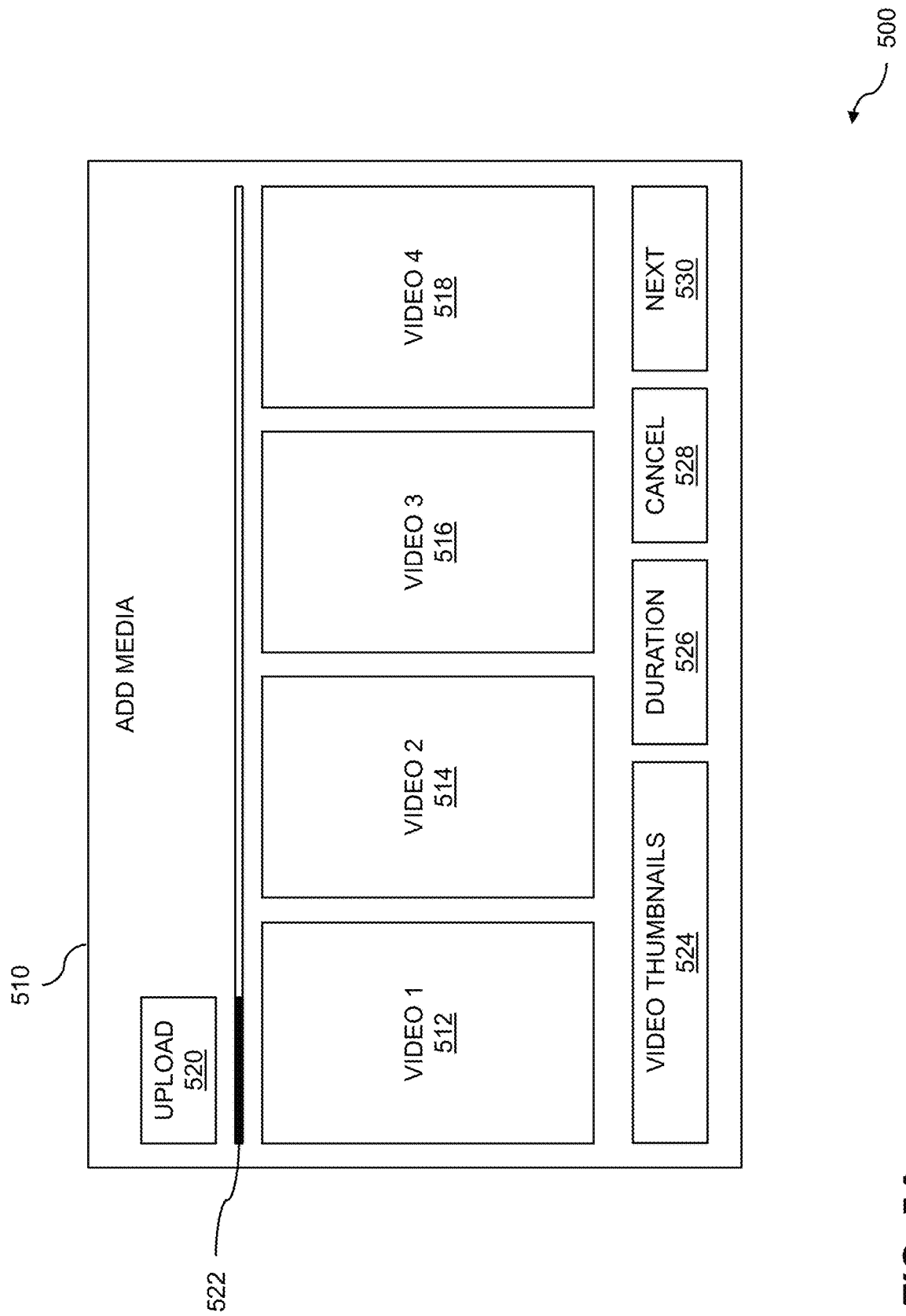
FIG. 5A shows an example video with added media.

FIG. 5A shows an example video with added media. Discussed above and throughout, videos such as short-form videos can be generated based on templates, metadata, and so on. Media can be added, where the added media can include media such as videos, short-form videos, music, audio files, still images, etc. that can be uploaded by a user, downloaded from a library, and so on. Adding media enables machine learned video template usage. A plurality of videos is obtained, wherein video scene analysis is performed on each of the plurality of videos. Video cuts are detected for each of the plurality of videos. Objects are identified within each of the plurality of videos. Metadata is categorized for each of the plurality of videos based on the scene analysis, the video cuts, and the objects within the plurality of videos. Template information is stored, including the metadata which was categorized, on each of the plurality of videos. A basis video is selected from the plurality of videos based on the template information. A further video is generated based on the basis video.

An example rendering for adding media is shown 500. The rendering can be displayed on a screen associated with an electronic device such as a computer including a desktop or laptop computer, a tablet, a smartphone, and so on. The rendering can be accomplished within a browser window, an app associated with video generation, a frame, and the like. Example videos, such as video 1 512, video 2 514, video 3 516, and video 4 518 can be shown, where the example videos can include popular videos, crowdsourced videos, favorite videos, etc. The videos can include videos, favorite videos, etc., provided by the user. Further videos in addition to videos 1-4 can be viewed by scrolling up or down within the window or frame 510. One or more videos can be selected from among the available videos and uploaded. The uploading can be accomplished by tapping or selecting a button such as an upload button 520. Upload progress can be displayed using a "thermometer" or bar display 522, a clock or timer, etc. The rendering shown in window or frame 510 can include one or more video thumbnails 524. The video thumbnails can include representations of the videos provided by the user, videos from a library, popular videos, crowdsourced videos, and so on. The rendering can include a duration 526. The duration can include a duration of a video or video clip, the direction of the template, etc. The rendering can include a cancel selection such as a cancel button 528. The cancel selection can cancel a video upload, cancel a template, and the like. The rendering can further include a next selection 530. The next selection can advance a video production project such as a short-form video based on a template. Advancing the project can include presenting a user with a rendering through which she or he can select styles such as video styles, music, brand labeling, and so on.

Figure 5B:
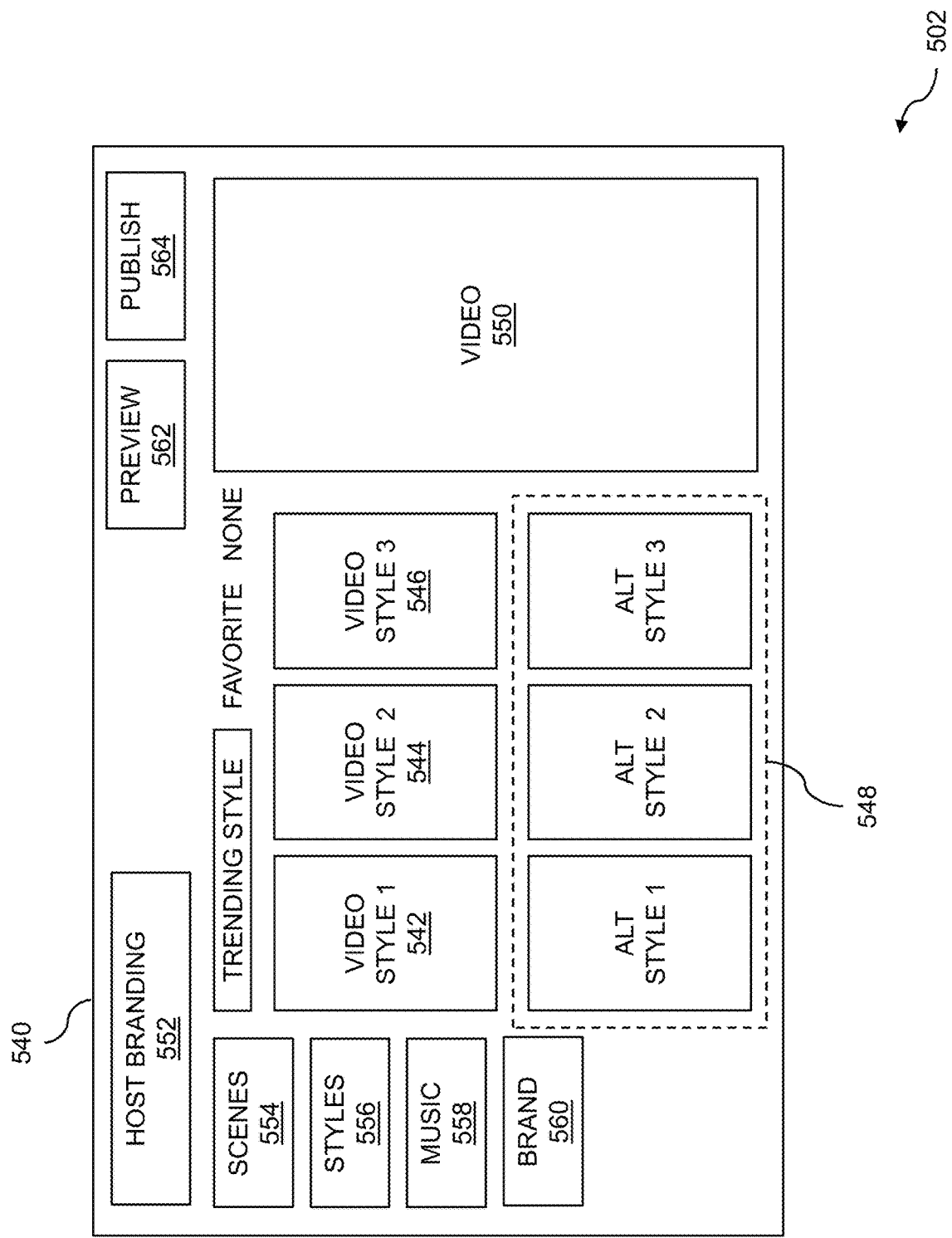
FIG. 5B shows an example preview and publish.

FIG. 5B shows an example preview and publish. Having selected a video based on a template as described above, a user can proceed to further manipulate their selected video. The manipulation of the selected video can include selecting scenes, styles, accompanying music, branding such as logos, and so on. The user can further preview her or his video, perform additional manipulation, and so on prior to publishing the video. Publishing the video can include uploading to a video site, sharing on a media platform such as a social media platform, and the like. Previewing and publishing 502 a video based on a template enables machine learned video template usage. Described previously, a video such as a short-form video can be rendered within a browser window, a frame, a window associated with an app, and so on. The rendering can be displayed on a screen associated with an electronic device such as a computer including a desktop or laptop computer, a tablet, a smartphone, and so on. An example window or frame is shown 540. The user can be presented with a variety of styles for their video, where the styles can include one or more of layouts, aspect ratios, text locations, positions within a video window, etc. In the example, three video styles are shown such as video style 1 542, video style 2 544, video style 3 546, and the like. Additional, alternate styles can also be included 548, such as alternate style 1, alternate style 2, and alternate style 3, and so on. The styles can be ranked based on one or more trending styles, popular styles, crowdsourced styles, etc. The user can scroll through available styles. In addition to the trending styles (as shown), the user can choose to view favorite styles by clicking or otherwise selecting favorites. The user can also choose to develop her or his own style by selecting none. As the user tries one or more styles, the video 550 can display the selected video as rendered based on the selected style.

Previewing and publishing a video can include adding host branding 552. The host branding can include a name such as a creator name, an organizational name, an enterprise name, and so on. The host branding can include a photo such as a photo of the creator, a corporate logo, and so on. The previewing and publishing can include scenes 554. The scenes can include popular, trending crowd sources, and other scenes. The scene can include one or more videos. The previewing and publishing can include styles 556. Selecting styles can display one or more video styles as described above, where the user can select from trending styles, popular styles, favorite styles, no styles, and the like. The previewing and publishing can include music 558. A video can be greatly enhanced by providing a soundtrack to the video. The music provided can include one or more musical styles such as classical, traditional, contemporary, easy listening, motivational, uplifting, epic, extreme, etc. The previewing and publishing can include branding 560, where branding can be used to add photos of creators, corporate logos, etc., to the video. The user can review the video that she or he has been working on. Clicking on preview 562 can enable the user to view their video, or to stop, rewind, swipe, pause, and otherwise control the video. When the user is satisfied with their video, they can publish 564 their video. The video can be published to a video sharing site, a social media site, and the like.

Figure 5C:
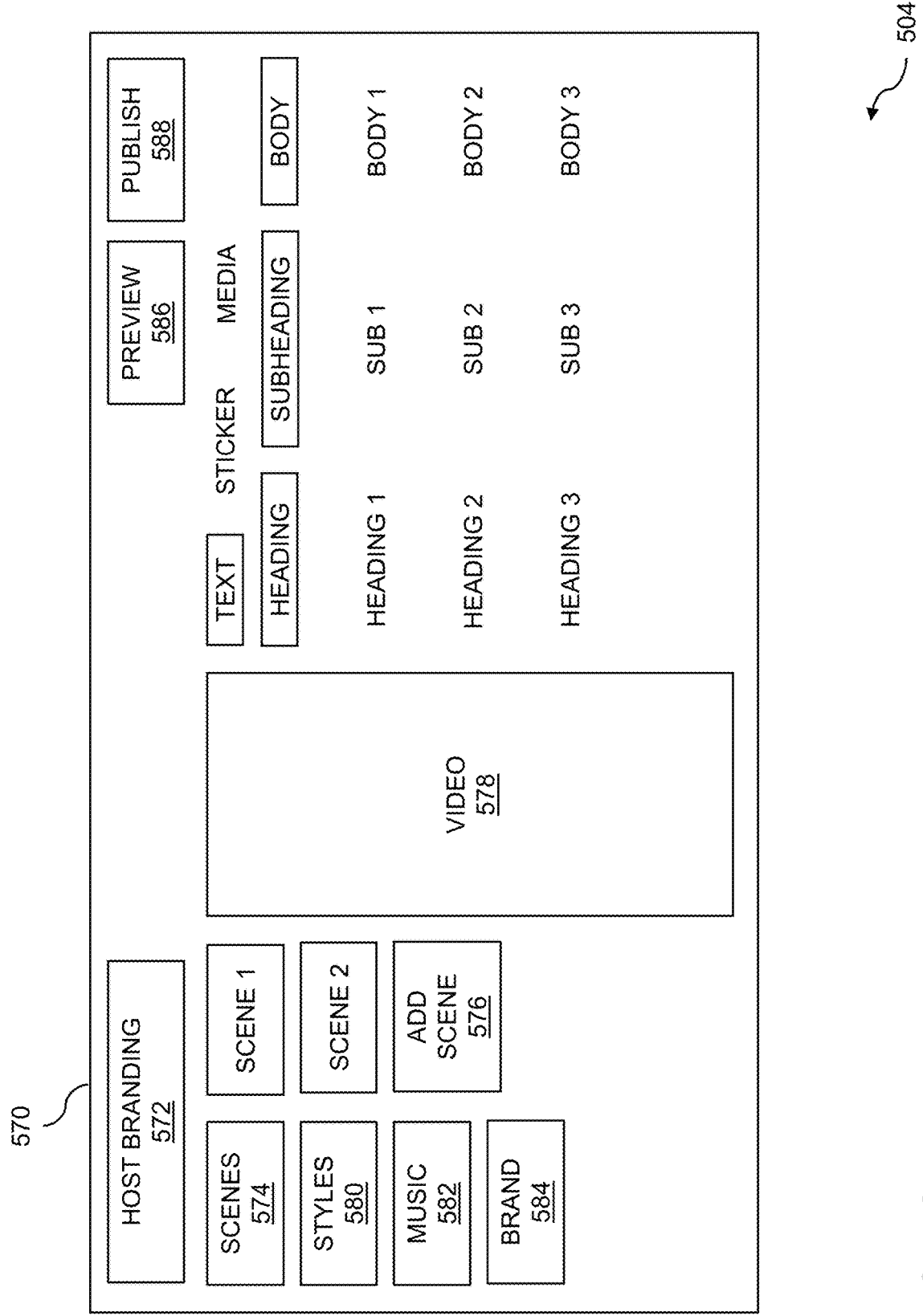
FIG. 5C shows adding scenes and text.

FIG. 5C shows adding scenes and text. Described above and throughout, a user can create a video such as a short-form video based on a template. The user can choose a scene, a style, and so on as discussed previously. The user can further manipulate her or his video by adding scenes, text, and so on. The adding scenes and text to a video 504 enables machine learned video template usage. The user's video can be rendered in a window, a frame, a window associated with an app, and so on. An example window or frame 570 is shown, where the window or frame can be displayed on an electronic device such as a computer, tablet, smartphone, etc. The window can include host branding 572, where the host branding can include branding associated with an organization or enterprise that can provide video editing capabilities. The user can manipulate their video from this window or frame by selecting scenes 574. One or more scenes can be shown, such as scene 1, scene 2, and so on. While two scenes are shown, other numbers of scenes can also be shown by selecting scenes 574. The user can choose to add one or more scenes 576. The added scenes can include scenes uploaded by the user, downloaded from a library of scenes, and the like. As the user tries one or more scenes for their video, the video can be displayed 578. Displaying the video can enable the user to try one or more different scenes and to select her or his preferred scene.

The user can choose among styles 580. The styles can include video layout, text positioning, sticker placement, and so on. As discussed previously, the user can select music 582 for their video. The music can include music composed and performed by the user, music for which rights have been obtained, open source music, free use music, and the like. The music can include music associated with one or more types or styles of music. The user can further choose to include branding 584, where the branding can include images, logos, GIFs, and so on, that can be associated with an individual, an organization, an enterprise, etc. Other buttons or selections that can be shown within the window of a frame 570 can include text, stickers, media, and so on. In the example shown, the user can select "text" which can open buttons, submenus, etc. such as headings, subheadings, body, and so on. One or more example headings can be displayed such as heading 1, heading 2, heading 3, and the like. A heading can include a text size, font, style, and so on. Various headings can be used to present different text locations, positions, placements, etc. within the video. One or more subheadings can also be presented, such as subheading 1, subheading 2, subheading 3, and so on. While a heading can include, for example, a larger font, a bolder color, and so on, a subheading can be associated with the heading and can include a smaller font, a different color, etc. Text can be provided under a heading, a subheading, etc. The text can be included in a text body style such as body 1, body 2, body 3, and so on. A body style can include text positioning such as left justified, right justified, centered, etc. The text body can include proportional, wrapped text, and so on. As for the heading and the subheading, a font type, size, color, etc., can be associated with each body style. The user can preview 586 her or his video. The preview can be used to check timing, pace, scene and style choices, musical matching, and the like. When the user is satisfied with their video, the video can be published 588. The publishing can include uploading the video to a video site, a social media site, etc. While the selection of the text menu or option is described, the user can further select "sticker", "media", and the like. A sticker can include an emoji, a GIF, and so on. Media can include videos, audio files, animations, etc.

Figure 6:
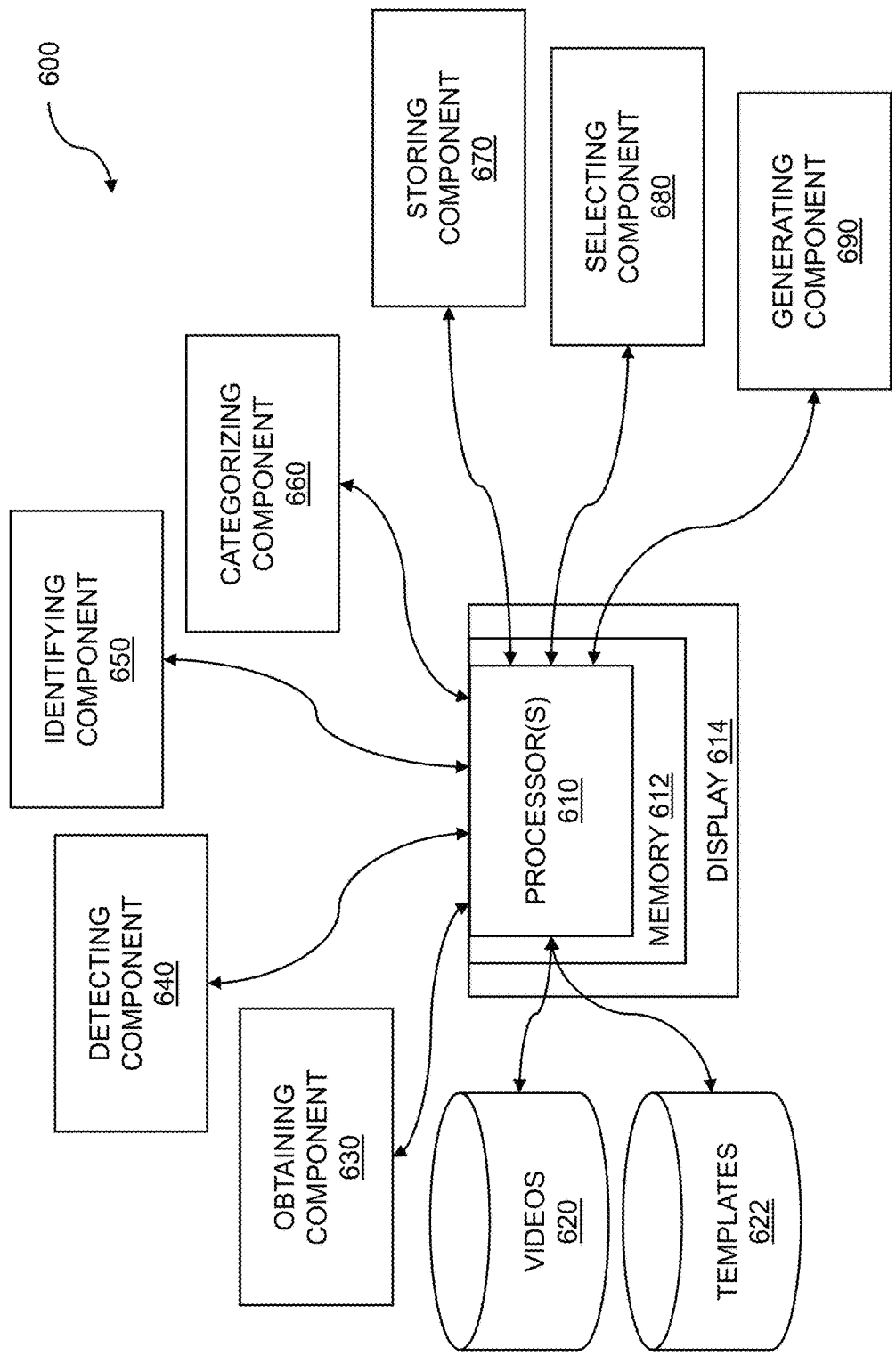
FIG. 6 is a system diagram for video manipulation.

FIG. 6 is a system diagram for video manipulation. Video generation is based on machine learned video template usage. The system 600 can include one or more processors 610 coupled to a memory 612 which stores instructions. The system 600 can include a display 614 coupled to the one or more processors 610 for displaying data, videos, intermediate steps, instructions, short-form videos, and so on. In embodiments, one or more processors 610 are coupled to the memory 612 where the one or more processors, when executing the instructions which are stored, are configured to: obtain a plurality of videos wherein video scene analysis is performed on each of the plurality of videos; detect video cuts for each of the plurality of videos; identify objects within each of the plurality of videos; categorize metadata for each of the plurality of videos based on the scene analysis, the video cuts, and the objects within the plurality of videos; store template information, including the metadata which was categorized, on each of the plurality of videos; select a basis video from the plurality of videos based on the template information; and generate a further video based on the basis video.

The system 600 can include a collection of videos 620. The videos 620 may be stored in storage such as electronic storage coupled to the one or more processors, a database, one or more statically linked libraries, one or more dynamically linked libraries, or other appropriate video or data formats. The videos can include short-form videos. A short-form video can include a video that can be shown with an amount of time including a few seconds, several seconds, a minute, and so on. A short-form video can convey content quickly and efficiently to a viewer of the short-form video. The short-form video can present a story, an advertisement, a political message, and the like. A short-form video can include a video from among a plurality of videos, where the videos can comprise a wide range or variety of content. The data can include textual information or data that can be associated with a webpage, as discussed below. The textual information can be augmented with image information, themes, and so on. The system 600 can include templates 622. The templates can be based on categorized metadata for each video, short-form video, and so on, stored in the collection of videos. The metadata can be based on video scene analysis, video cuts, and objects within a plurality of videos. The templates can include template videos and template information. As with the videos, the templates can be stored in storage such as electronic storage coupled to the one or more processors, a database, one or more statically linked libraries, one or more dynamically linked libraries, or other appropriate template formats.

The system 600 can include an obtaining component 630. The obtaining component 630 can include functions and instructions for obtaining a plurality of videos. The videos can include videos such as short-form videos. The videos can be downloaded from or recommended by a library, selected by a user, provided to a user, crowdsourced by users, and so on. The videos, short-form videos, etc., can include a variety of content. In embodiments, the videos can include travel videos, cooking videos, home improvement videos, makeup videos, animal videos, and the like. The obtaining component can further perform video scene analysis where video scene analysis is performed on each of the plurality of videos. The video scene analysis can include detecting video cuts, video content, and so on. The system 600 can include a detecting component 640. The detecting component 640 can include functions and instructions for detecting video cuts for each of the plurality of videos. A video cut can include an abrupt transition within a video such as a short-form video. A video cut can indicate a transition between video segments. The video cut can include a variety of transition techniques including an L-cut, a cutaway, a match cut, a jump cut, a cross cut, etc.

The system 600 can include an identifying component. The identifying component 650 can include functions and instructions for identifying objects within each of the plurality of videos. The objects can include landscapes, where the landscapes can include trees and other plants; mountains; water such as streams, rivers, lakes, or an ocean; etc. The objects can include people, animals, human-made objects, and the like. In embodiments, the identifying the objects can include detecting a person, a face, a building, a vehicle, a location, etc. More than one object can be identified within each video. In embodiments, the identifying objects can include a confidence level of an object that is identified. The confidence level can be based on a threshold or a range of values; a quality such as high, medium, or low; and so forth. The system 600 can include a categorizing component 660. The categorizing component 660 can include functions and instructions for categorizing metadata for each of the plurality of videos based on the scene analysis, the video cuts, and the objects within the plurality of videos. Metadata, or "data about data", can include a range of information about a given video such as a short-form video. The metadata can include a title for the video, a description associated with the video, publication data, tags or words used to describe video content, one or more categories, and the like.

The system 600 can include a storing component 670. The storing component 670 can include functions and instructions for storing template information, including the metadata which was categorized, on each of the plurality of videos. Template information associated with a video such as a short-form video can include a beginning cut, an ending cut, locations within a video where additional videos can be inserted, information about how the video can be inserted into another video, and the like. In embodiments, each video of the plurality of videos can be stored as a template video along with the template information. The template video can represent a compressed version of the video. In other embodiments, the template videos are obtained through crowdsourcing. The template videos can include videos uploaded by individuals, popular videos selected by a plurality of individuals, and so on. The template videos can include objects, where the objects can include famous or popular buildings and locations; political figures, leaders, media stars, or celebrities; influencers or tastemakers; etc. The templates can be ranked, ordered, prioritized, and so on. Further embodiments include ranking the template information on a subset of videos from the plurality of videos. The ranking can be based on a percentage, a threshold, a vote, and the like. The ranking can be based on a crowdsourced ranking.

The system 600 can include a selecting component 680. The selecting component 680 can include functions and instructions for selecting a basis video from the plurality of videos based on the template information. In embodiments, one of the template videos can be used as the basis video. The basis video can be added to, edited, altered, deleted from, and so on. Embodiments include selecting a video template based on the template information that was ranked. The selecting can be based on highly ranked templates, templates ranked based on user preferences, crowdsource-ranked templates, and the like. The selecting video templates can include recommending video templates. Embodiments include recommending a plurality of video templates based on the ranking of the template information. Other bases can be used for the ranking, and by extension, the selecting. In embodiments, the ranking can be based on a view count for each video from the subset of videos. Popular or most watched videos can receive a higher ranking than rarely watched or unpopular videos. In other embodiments, the ranking can be based on an engagement score for each video from the subset of videos. The engagement score can be based on a gaze direction, on an amount of time an individual spends watching the video, on a share count, and the like. Note that the length of a video can range from a few seconds to hours in duration. Videos such as a short-form videos typically have a length of fewer than ten minutes. In embodiments, the ranking can be based on a segment duration for each video from the subset of videos. The ranking of the videos can also be based on information such as text information received from an individual. In embodiments, the ranking can be based on comparison of template information with user text input. Recall that the video templates and the video information that is stored can be based on videos provided from a variety of sources. In embodiments, the ranking can be based on analysis of user provided video for video content and metadata associated with the user provided video. Recall that videos are selected for an individual because the individual wants to generate video. In embodiments, the ranking can be based on a subject for a further video. The subject of the video can include entertainment, information, education, amusement, etc. In other embodiments, the ranking can be based on a classification of the subset of videos. The classification of the video can include a travel, cooking, home improvement, makeup, animals, or some other type of video. The video can include a video created for the pure joy of creating it.

The system 600 includes a generating component 690. The generating component can generate a further video based on the basis video. The video that is generated can include a long-form video, a short-form video, and so on. The generated further video can include a "mashup" of basis videos. The generating the further video can be based on the basis video and a second basis video. The basis video and the second basis video can be used in part or in entirety. In embodiments, a portion of the basis video and a portion of the second basis video can each be used as portions of the further video. The basis video and the second basis video can be used to generate the further video, where the further video can comprise a plurality of layers. In embodiments, the portion of the basis video and the portion of the second basis video can include a two-layer template video. A multilayer template video such as the two-layer template video can enable filter effects, picture-in-picture effects, superimposed videos, and so on. In a usage example, a first video can include a person watching a video on a television or other screen. The second basis video can be superimposed on the viewing screen within the first basis video. Other embodiments include storing the further video as a further template video along with the original template videos. Storing the further template video enables usage of the further template video for generating other further videos.

The system 600 can include a computer program product embodied in a non-transitory computer readable medium for video generation, the computer program product comprising code which causes one or more processors to perform operations of: obtaining a plurality of videos wherein video scene analysis is performed on each of the plurality of videos; detecting video cuts for each of the plurality of videos; identifying objects within each of the plurality of videos; categorizing metadata for each of the plurality of videos based on the scene analysis, the video cuts, and the objects within the plurality of videos; storing template information, including the metadata which was categorized, on each of the plurality of videos; selecting a basis video from the plurality of videos based on the template information; and generating a further video based on the basis video.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video generation comprising:
    obtaining a plurality of videos, wherein video scene analysis is performed on each of the plurality of videos;
    detecting video cuts for each of the plurality of videos;
    identifying objects within each of the plurality of videos;
    categorizing metadata for each of the plurality of videos based on the scene analysis, the video cuts, and the objects within the plurality of videos;
    storing template information, including the metadata which was categorized, on each of the plurality of videos;
    selecting a basis video from the plurality of videos based on the template information;
    obtaining user-added text;
    generating a further video based on the basis video and a second basis video, wherein the further video includes the user-added text added to one or more scenes of the further video; and
    recommending one or more additional videos for inclusion in the further video, based on the obtained user-added text, wherein the further video comprises a two-layer template video, wherein the two-layer template video comprises the second basis video superimposed on the basis video.

2. The method of claim 1 wherein each video of the plurality of videos is stored as a template video along with the template information.

3. The method of claim 2 wherein one of the template videos is used as the basis video.

4. The method of claim 2 further comprising storing the further video as a further template video along with the template videos.

5. The method of claim 4 wherein the further template video includes further template video information on scene analysis, video cuts, and objects within the further video.

6. The method of claim 2 wherein the template videos are obtained through crowdsourcing.

7. The method of claim 1 wherein a portion of each video of the plurality of videos is stored as a template video along with the template information.

8. The method of claim 7 wherein the portion comprises a template video module.

9. The method of claim 1 further comprising ranking the template information on a subset of videos from the plurality of videos.

10. The method of claim 9 further comprising selecting a video template based on the template information that was ranked.

11. The method of claim 9 further comprising recommending a plurality of video templates based on the ranking of the template information.

12. The method of claim 11 wherein the basis video is selected from the plurality of video templates that were recommended.

13. The method of claim 9 wherein the ranking is based on a view count, an engagement score, a segment duration, a comparison of template information with user text input, a subject for the further video, or a classification of the subset of videos for each video from the subset of videos.

14. The method of claim 9 wherein the ranking is provided in a non-deterministic manner.

15. The method of claim 9 wherein the ranking is based on analysis of user provided video for video content and metadata associated with the user provided video.

16. The method of claim 1 wherein the generating includes augmenting the basis video with personalized video content.

17. The method of claim 1 wherein the identifying objects includes a confidence level of an object that is identified.

18. The method of claim 1 wherein the video scene analysis includes analysis of content of a scene in a video from the plurality of videos.

19. The method of claim 18 wherein the video cuts define boundaries of a scene in the video.

20. The method of claim 1 wherein the selecting the basis video is accomplished via automatically curating a subset of the plurality of videos.

21. The method of claim 1 further comprising enabling video production.

22. The method of claim 1 wherein the basis video includes a viewing screen, and wherein the second basis video is superimposed on the viewing screen from the basis video.

23. A computer program product embodied in a non-transitory computer readable medium for video generation, the computer program product comprising code which causes one or more processors to perform operations of:
obtaining a plurality of videos wherein video scene analysis is performed on each of the plurality of videos;
detecting video cuts for each of the plurality of videos;
identifying objects within each of the plurality of videos;
categorizing metadata for each of the plurality of videos based on the scene analysis, the video cuts, and the objects within the plurality of videos;
storing template information, including the metadata which was categorized, on each of the plurality of videos;
selecting a basis video from the plurality of videos based on the template information;
obtaining user-added text;
generating a further video based on the basis video and a second basis video, wherein the further video includes the user-added text added to one or more scenes of the further video; and
recommending one or more additional videos for inclusion in the further video, based on the obtained user-added text, wherein the further video comprises a two-layer template video, wherein the two-layer template video comprises the second basis video superimposed on the basis video.

24. A computer system for video generation comprising:
a memory which stores instructions;
one or more processors coupled to the memory wherein the one or more processors, when executing the instructions which are stored, are configured to:
obtain a plurality of videos wherein video scene analysis is performed on each of the plurality of videos;
detect video cuts for each of the plurality of videos;
identify objects within each of the plurality of videos;
categorize metadata for each of the plurality of videos based on the scene analysis, the video cuts, and the objects within the plurality of videos;
store template information, including the metadata which was categorized, on each of the plurality of videos;
select a basis video from the plurality of videos based on the template information;
obtain user-added text;
generate a further video based on the basis video and a second basis video, wherein the further video includes the user-added text added to one or more scenes of the further video; and
recommend one or more additional videos for inclusion in the further video, based on the obtained user-added text, wherein the further video comprises a two-layer template video, wherein the two-layer template video comprises the second basis video superimposed on the basis video.

* * * * *